Feb. 23, 1937.  M. S. MOORE  2,072,009
LOADING MACHINE FOR MINES
Filed July 27, 1935
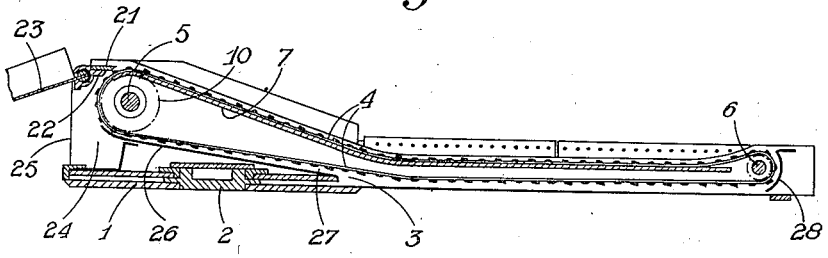
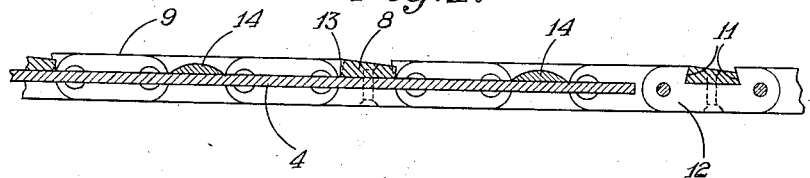
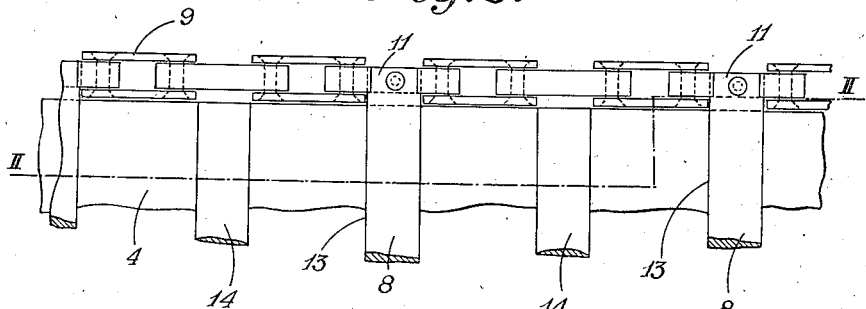
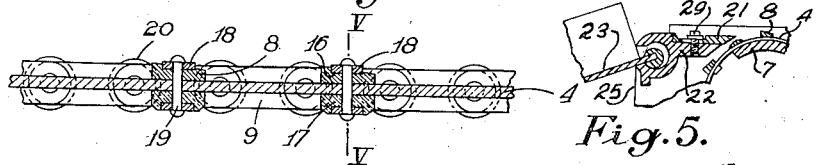
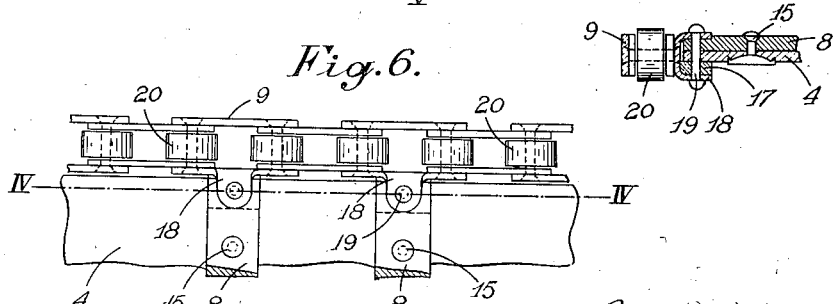
M. S. Moore
Inventor
by Glascock Downing & Seebold
Attys.

Patented Feb. 23, 1937

2,072,009

UNITED STATES PATENT OFFICE 2,072,009

LOADING MACHINE FOR MINES

Matthew Smith Moore, Malvern, England, assignor of one-half to The Mining Engineering Company Limited, Worcester, England, a British company Application July 27, 1935, Serial No. 33,691
In Great Britain August 7, 1934

10 Claims. (Cl. 198—199)

This invention relates to a loading machine for mines of the type described in Patent No. 1,930,016, which machine comprises a rotatable loader bar extending parallel to an endless conveyor arranged transversely of the machine and adapted to discharge the coal onto a conveyor belt or like conveying means whereby it is removed to wagons or the like. In this machine the endless conveyor comprises a belt having a flat portion projecting outwardly from one of the sides of the machine casing, and a rising portion extending around the driving shaft on the machine and adjacent a plate or bridge over which the coal or other material is discharged.

When dealing with coal considerable difficulty has been experienced at times both in controlling the uniform progress of the very large pieces which sometimes fall onto the belt and in evacuating the dust which falls under the belt and tends to accumulate between the return side of the belt and the machine frame. This is more particularly the case when the "throw-off" plate, i. e. the plate over which the coal is delivered by the belt, is arranged at or near the highest point of the belt.

My present invention has for its object to overcome these difficulties.

With this object in view, in accordance with my invention I provide on the machine a conveyor comprising a flexible belt, slats extending across said belt, and means co-operating with said slats for preventing the accumulation of dust between the return side of the belt and the machine frame.

The slats, or some of them, for example alternate slats, are advantageously made of trapezoidal cross-section, with an upstanding front edge of suitable height, so that they get a sufficient hold on the coal to push it gently up the incline, while at the same time the slats on the return side of the belt are adapted to act as scrapers for the dust. The throw-off plate is preferably adjustable towards and away from the conveyor belt so that the gap through which dust is liable to fall under the belt can be made so small as is strictly necessary to provide clearance for the slats.

Under the throw-off plate is a chamber open at the side opposite the conveyor to provide an outlet for the fine material and dust carried by the belt between the slats. Between the return side of the belt and the bottom plate of the machine, I provide a plate or shield sloping downwardly so that such portion of the fine material carried by the belt under the throw-off plate, as is not evacuated through the open side of the dust chamber, will find an outlet through the gap between the belt and said shield. Another shield may be provided at the return end of the belt to prevent clogging by dust scraped from the floor.

In the accompanying drawing illustrating by way of example an embodiment of my invention.

Fig. 1 is a sectional elevation of the conveyor.

Fig. 1a is a sectional view on an enlarged scale of the throw-off plate showing the means for adjustably securing same in position.

Fig. 2 is a fragmentary view on a larger scale showing the conveyor belt and slats in section on line II—II of Fig. 3, and Fig. 3 is a plan view corresponding to Fig. 2.

Fig. 4 illustrates a modification in section on line IV—IV of Fig. 6;

Fig. 5 is a cross-section on line V—V of Fig. 4 and

Fig. 6 is a corresponding plan view.

In the drawing, 1 is the base plate of the loading machine on which is pivoted, at 2, a frame 3 supporting the conveyor which comprises the belt 4, driving shaft 5, end shaft 6 and guide plate 7 comprising an inclined portion and an outer horizontal portion.

The belt 4 which may be of any suitable material such as rubber covered cotton, is provided with slats 8 riveted or otherwise fastened thereon. At their ends, the slats 8 are secured to chains 9 driven by sprockets 10 on the shaft 5. The slats 8 are made of trapezoidal cross-section, the higher edge 13 being in front, this shape having proved to afford a good hold in the coal to be conveyed, while efficiently preventing the accumulation of dust under the belt.

In the construction illustrated in Figs. 2 and 3, the ends of the slats 8 are dovetailed as shown at 11 and engaged in correspondingly shaped recesses or notches cut in some 12, of the chain links. In addition to the carrying slats 8, and preferably in alternate relation therewith, I may provide additional slats 14 of half round or other cross-section to reinforce the belt.

In the modification shown in Figs. 4 to 6 all the slats are of trapezoidal cross-section with an upstanding front edge 13, and they are secured by rivets 15 to the belt 4. Their ends, preferably notched as shown at 16, are engaged together with the belt and suitable packing pieces 17 between lugs 18 formed on alternate chain links, the parts being secured together by rivets 19. This type of chain is fitted with rollers 20 running in suitable tracks (not shown).

Substantially tangential to the raised end of the conveyor is the throw-off plate 21 which is adjustably fitted on its support 22 whereon it is secured by means of bolts 29 (Fig. 1a) or otherwise in the most suitable position with relation to the belt. In operation, the coal falling on the flat portion of the belt is caught by the slats 8, carried up the slope and thrown over the plate 21 onto a chute 23 whence it is delivered for example to a longwall conveyor (not shown).

The fine material and dust which is carried between the slats 8 under the plate 21 falls into a chamber 24 which is provided under said plate and is open at 25 on the side remote from the belt. In order to prevent accumulation of dust under the belt I arrange under the return side of the belt a plate or shield 26 sloping downwardly in a direction almost parallel to, though slightly more inclined than, the return side of the belt, thus forming a gap 27 gradually flaring downwardly. While the greater part of the fine material carried by the belt under the plate 21 is evacuated through the open side 25 of the dust chamber, the surplus will be removed through the gap 27. The slats 8 acting as scrapers along the plate 26, the material falling thereon will be pushed outwardly and thrown on the floor.

To prevent dust scraped from the floor by the return side of the belt clogging the end support, I further provide at the return end of the conveyor, a curved plate or shield 28, which is slightly eccentric to the shaft 6 and provides a gap of increasing cross-section through which any material caught by the underside of the belt is brought to the upper side where it is dealt with together with the material fed to the conveyor.

I claim:

1. In a loading machine for mines, the combination of a machine frame, a conveyor extending transversely of said frame, said conveyor comprising an endless belt and slats extending across said belt, and means co-operating with said slats for preventing the accumulation of dust between the return side of said belt and said machine frame, said means comprising a throw-off plate substantially tangential to the delivery end of said conveyor, and an inclined dust shield under the return side of said conveyor.

2. In a loading machine for mines, the combination of a machine frame, an endless belt conveyor extending transversely of said frame, said conveyor having a rising portion over said frame and a flat portion extending outwardly therefrom, slats on said conveyor, and means co-operating with said slats for preventing the accumulation of dust between the return side of said belt and said machine frame, said means comprising a throw-off plate extending substantially tangentially to the top portion of said conveyor, and a plate under the return side of said conveyor, said plate being slightly more inclined than said return side.

3. In a loading machine for mines, the combination of a machine frame, an endless belt conveyor extending transversely of said frame, slats on said conveyor, said slats having a trapezoidal cross-section with an upstanding front edge of greater height than its rear edge, and means co-operating with said slats for preventing the accumulation of dust between the return side of said belt and said machine frame, said means comprising a throw-off plate extending substantially tangentially to the delivery portion of said conveyor, an inclined plate under the return side of said conveyor, and a dust chamber between said throw-off plate and said inclined plate.

4. In a loading machine for mines, the combination of a machine frame, an endless belt conveyor extending transversely of said frame and having a rising portion over said frame, slats on said conveyor of trapezoidal cross-section with an upstanding front edge of greater height than its rear edge, and a horizontal throw-off plate substantially tangential to the higher portion of said conveyor, said plate being horizontally adjustable on said frame towards and away from said conveyor.

5. In a loading machine for mines, the combination of a machine frame, an endless belt conveyor having a rising portion over said frame, slats on said conveyor and an inclined plate between said frame and the return side of the belt conveyor, the space between said plate and the return side of said belt conveyor gradually increasing in width towards the end of said plate.

6. In a loading machine for mines, the combination of a machine frame, an endless belt conveyor having a rising portion over said frame, slats on said conveyor of trapezoidal cross-section with an upstanding front edge of greater height than its rear edge, and a plate between said frame and the return side of said belt conveyor, said plate being in close proximity to but slightly more inclined than the return side of said belt conveyor.

7. In a loading machine for mines, the combination of a machine frame, an endless belt conveyor extending across said frame and having a rising portion over said frame, slats on said conveyor of trapezoidal cross-section with an upstanding front edge, a throw-off plate adjustably mounted on said frame adjacent the top of the rising portion of said conveyor, and a shield between said frame and the return side of said conveyor, said shield being slightly more inclined than the return side of said conveyor.

8. In a loading machine for mines, the combination of a machine frame, an endless belt conveyor having a rising portion over said frame and an outwardly extending flat portion, slats on said conveyor having an upstanding front edge, an inclined dust shield between said frame and the return side of said conveyor, and a curved shield surrounding the outer end of said conveyor, said curved shield being spaced away from said dust shield.

9. In a loading machine for mines, the combination of a machine frame, an endless belt conveyor extending across said frame and having a rising portion over said frame and an outwardly extending flat portion, slats on said conveyor having an upstanding front edge, a throw-off plate adjustably mounted on said frame adjacent the top of the rising portion of said conveyor, a shield between said frame and the return side of said conveyor, said shield being slightly more inclined than the return side of said conveyor, and a curved shield surrounding the outer end of said conveyor and slightly eccentric thereto.

10. In a loading machine for mines, the combination of a machine frame, an endless conveyor belt extending across said frame, slats on said belt of trapezoidal cross-section with an upstanding front edge, chains on each side of said belt, means connecting said slats with said chains, a throw-off plate on said frame adapted to co-operate with said slats, and a plate under the return side of said belt leaving between said plate and return side a gap flaring in the direction of movement of said belt.

MATTHEW SMITH MOORE.